United States Patent
Yasue et al.

(10) Patent No.: US 6,834,135 B2
(45) Date of Patent: Dec. 21, 2004

(54) OPTICAL SWITCHING SYSTEM

(75) Inventors: Toshihiko Yasue, Moriguchi (JP); Masaru Fuse, Neyagawa (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 10/723,636

(22) Filed: Nov. 26, 2003

(65) Prior Publication Data

US 2004/0151421 A1 Aug. 5, 2004

(30) Foreign Application Priority Data

Nov. 28, 2002 (JP) ........................................ 2002-345494

(51) Int. Cl.$^7$ ................................................. G02B 6/26
(52) U.S. Cl. ........................... 385/16; 385/15; 359/107; 359/108
(58) Field of Search ............................. 385/16, 17, 18, 385/22

(56) References Cited

U.S. PATENT DOCUMENTS

| | | | |
|---|---|---|---|
| 5,568,575 A | * | 10/1996 | Sato ............................ 385/16 |
| 6,591,037 B2 | * | 7/2003 | Yonekubo .................... 385/32 |
| 2003/0059154 A1 | * | 3/2003 | Sato ............................ 385/17 |

FOREIGN PATENT DOCUMENTS

JP         2001-036477         2/2001

OTHER PUBLICATIONS

S.J. Ben Yoo, "All–optical swtiching Architecture, Protocol and Systems Demonstration", Technical Digest of Opto-Electronics and Communications Conference (OECC), paper No. 9A1–1, pp. 8–9, Yokohama, Jul. 2002.

A.B. Sahin et al., "Dispersion Division Multiplexing for In–Band Subcarrier–Header–Based All–Optical Packet Switching", OSA Technical Digest of OFC (Optical Fiber Communication conference) No. WO1, pp. 279–280, Mar. 2002.

Iga, "Semiconductor Laser", Chapter 7: Direct Modulation and Pulse Generation, Ohmsha, 1994 (with English translation and verification statement).

Ikushima et al., "Study on Analog Performance of Optical Devices and System Design for 10,000 ch WDM/SCM Optical Transmission System using Direct Modulation", ITE(The Institute of Image Information and Television Engineers) Journal vol. 55, No. 10, 2001, pp. 1315–1321.

* cited by examiner

Primary Examiner—Akm Enayet Ullah
Assistant Examiner—Jennifer Doan (57) ABSTRACT

An optical switching system that switches the output port of an optical signal as indicated by address information (a label) that is contained in optical data packets constituting the optical signal. The optical switching system reads the address information by detecting the electric power level of a label signal that has been subjected to an optical angular modulation, passed through an optical filter and been subjected to an optical detection.

3 Claims, 11 Drawing Sheets

| DESTINATION | FREQUENCY (GHz) |
|---|---|
| 1 (TOKYO) | f1 |
| 2 (FUKUOKA) | f2 |
| ... | ... |

| ELECTRIC POWER LEVEL (dBm) | PORT NUMBER |
|---|---|
| P1 | 1 (TOKYO) |
| P2 | 2 (FUKUOKA) |
| ... | ... |

| FREQUENCY (GHz) | ELECTRIC POWER LEVEL (dBm) |
|---|---|
| f1 | P1 |
| f2 | P2 |
| ... | ... |

OPTICAL SWITCHING SYSTEM

BACKGROUND OF THE INVENTION (1) Field of the Invention

The present invention relates to an optical switching system for routing optical signals that contain address information indicating destinations of the optical signals in an optical communication network.

(2) Description of the Related Art

In optical communication networks, switching apparatuses are placed at switching points where they receive optical signals from optical transmission apparatuses and switch the destinations of the received signals. At the switching points, the switching apparatuses route the optical signals according to the address information contained in packets that constitute the optical signals, where each signal, either electrical or optical, is a sequence of packets. The electric signals are converted into the optical signals through a modulation and then an electrical-to-optical conversion. Each of the packets constituting the signals is composed of transmission data and a header that contains address information indicating the destination of the signal. The packets constituting the optical signals are hereinafter referred to as optical packets.

In earlier days, when conventional switching apparatuses receive an optical signal composed of optical packets, they convert each optical packet into an electric-signal packet by performing an optical-to-electrical conversion and then a demodulation so as to extract the address information from the header of each electric-signal packet.

The conventional switching apparatuses then update the address information if necessary, re-convert the electric signal into the optical signal, and transmit the re-converted optical signal to the destination (another switching apparatus or a destination apparatus) in accordance with the extracted address information (see Patent Document 1: Optical Label Multiplexing, FIG. 4, listed below).

As understood from the above description, each switching apparatus performs the two-way conversion, namely optical-to-electrical and electrical-to-optical, to extract the address information from each packet. As a result, the conventional system has a problem that the transmission speed in the optical communication network is limited by the two-way conversion performed by the switching apparatuses.

For the purpose of solving the above-mentioned problem, various methods based on the optical label switching have been proposed so far (see, for example, the Patent Document 1 (especially FIG. 6) and Non-Patent Documents 1 and 2, listed below).

In the optical label switching, an optical transmitting unit transmits an optical signal that contains the address information (hereinafter referred to as a label) in each header of each packet, and an optical switching unit that receives the optical signal causes the received optical signal to branch into two optical signals that have the same information, extracts and extracts only the label of each packet contained in one branched optical signal, and outputs the other branched optical signal after switching its route based on each extracted label.

As described above, in the known optical label switching, the optical switching unit need not convert optical signals of the entire packet into electrical, but reads only a part (the label) of each packet. Further, the optical switching unit need not re-convert the electric signal into an optical signal after it extracts the label. Such an arrangement in this technology is considered to have increased the speed in switching the destinations of the optical signals.

However, in this known optical label switching method, the optical transmitting unit needs to perform a modulation and a frequency conversion on a label signal that is generated based on the label, so that the label signal has a higher frequency than the other portions of the electric signal. The optical switching unit performs a frequency conversion and a demodulation on the received label signal to extract the label.

Accordingly, the optical signal switching speed at the optical switching unit is limited by the modulation, demodulation, and frequency conversion of the label signal.

The above-mentioned problem in the known optical label switching will be described in detail with reference to FIGS. 9–11.

Known Optical Label Switching Method

Figure 9:
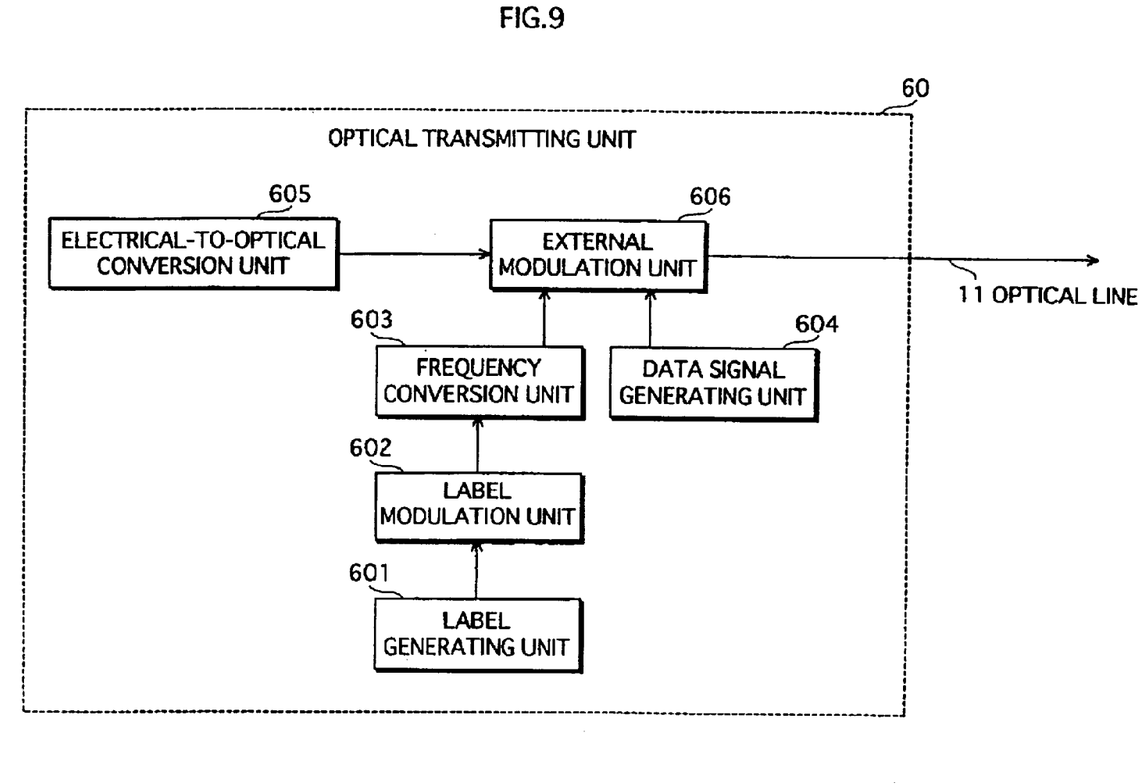
FIG. 9 is a block diagram showing the construction of an optical transmitting unit included in a conventional optical switching system.

FIG. 9 is a functional block diagram showing the construction of an optical transmitting unit included in an optical label switching system.

Figure 10:
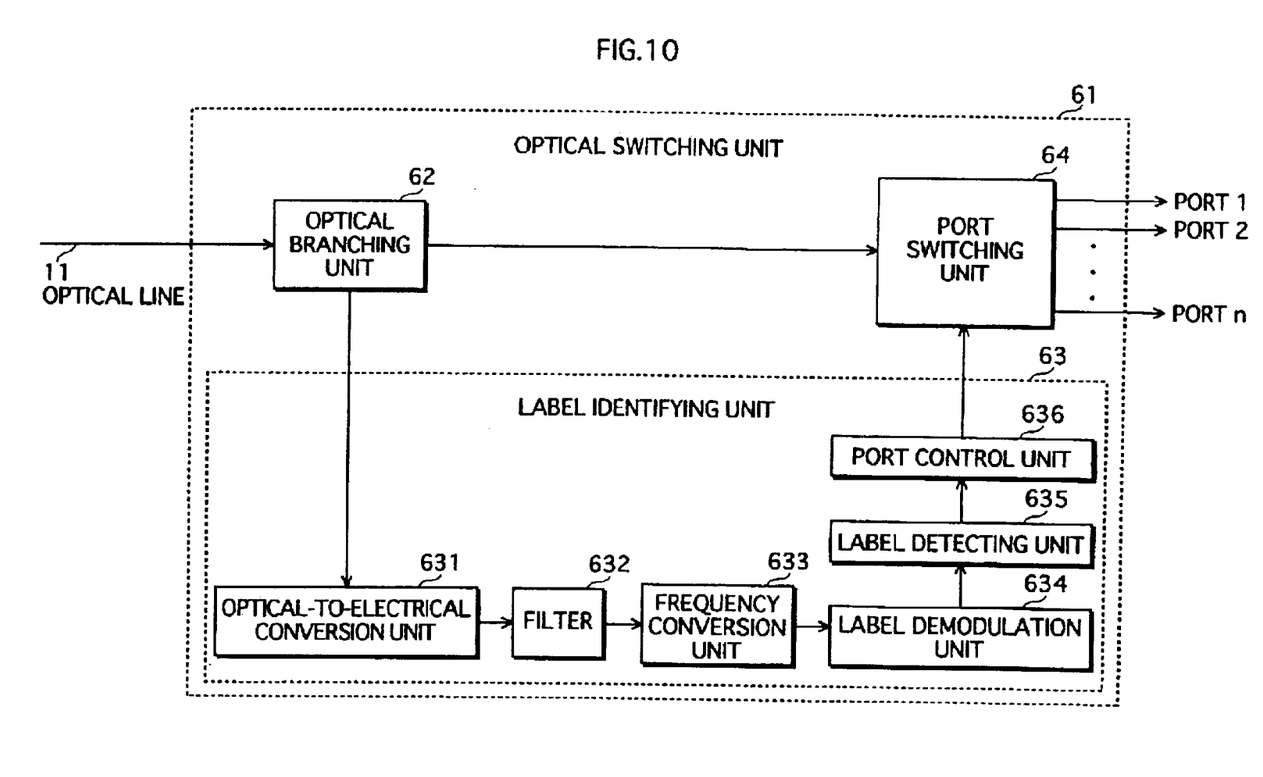
FIG. 10 is a block diagram showing the construction of an optical switching unit included in a conventional optical switching system.

FIG. 10 is a functional block diagram showing the construction of an optical switching unit included in the optical label switching system.

An optical transmitting unit 60 converts data into an optical signal and transmits the optical signal into an optical communication network as a sequence of optical packets.

An optical switching unit 61 assigns each optical packet it receives from the optical transmitting unit 60 to an appropriate port in accordance with the destination of the optical packet, and outputs the optical packet to the assigned port.

First, the operation of the optical transmitting unit 60 will be explained.

A data signal generating unit 604 generates a data signal representing data to be transmitted, and outputs the generated data signal.

A label generating unit 601 generates a label signal based on the label contained in each packet, where the label indicates the address information of the packet constituting the data signal.

A label modulation unit 602 modulates the label signal and outputs a modulated label signal. The label modulation unit 602 is achieved by, for example, a BPSK (Binary Phase Shift Keying) modulator.

Figure 11:
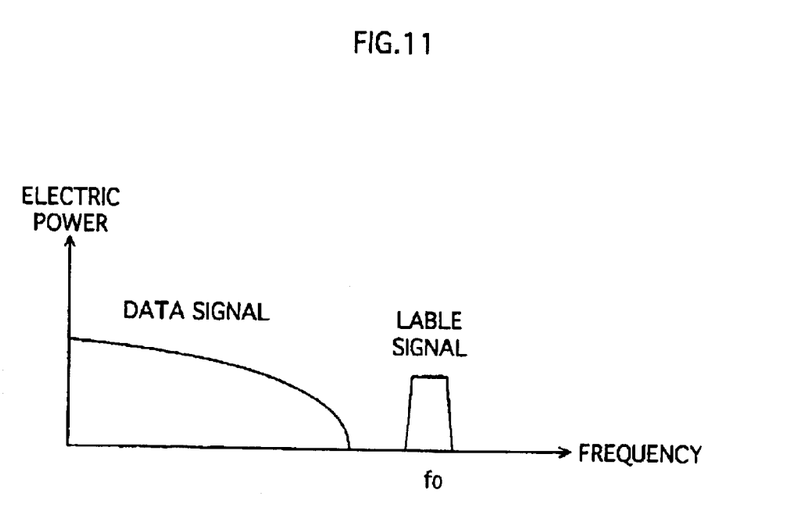
FIG. 11 shows the frequency allocation of the data signal and the label signal in a conventional optical switching system.

FIG. 11 shows the frequency allocation of the data signal and the label signal. Since the label signal is a modulated signal, it has a predetermined band width, with its center at f0.

A frequency conversion unit 603 converts the frequency of the modulated label signal into a desired frequency, and outputs the modulated label signal having the desired frequency.

An electrical-to-optical conversion unit 605 outputs a continuous optical signal.

An external modulation unit 606 performs the intensity modulation on the continuous optical signal received from the electrical-to-optical conversion unit 605 in accordance with (i) the modulated label signal received from the frequency conversion unit 603 and (ii) the data signal received from the data signal generating unit 604, and outputs an optical signal composed of packets.

An optical switching unit 61 extracts a label contained in an optical signal that has been received via an optical line 11, selects one among n output ports based on the extracted label, and outputs the optical signal to the selected port, where n is an integer no smaller than "2".

As shown in FIG. 10, an optical branching unit 62 of the optical switching unit 61 receives the optical signal via the optical line 11, and causes the received optical signal to branch to a label identifying unit 63 and a port switching unit 64.

An optical-to-electrical conversion unit 631 of the label identifying unit 63 receives one of the outputs from the optical branching unit 62, and converts the branched optical signal into an electric signal.

A filter 632 extracts a modulated label signal from the electric signal output from the optical-to-electrical conversion unit 631.

A frequency conversion unit 633 converts the frequency of the modulated label signal.

A label demodulation unit 634 demodulates the electric signal output from the frequency conversion unit 633, and outputs a demodulated label signal.

A label detecting unit 635 detects the address information, namely the label, from the label signal output from the label demodulation unit 634.

A port control unit 636 determines a port among the n output ports based on the address information detected by the label detecting unit 635, and controls the port switching unit 64 to output the other branched optical signal to the determined port.

As described above, in the known optical label switching method, the optical transmitting unit performs a modulation and a frequency conversion on a label signal, and the optical switching unit performs a frequency conversion and a demodulation on the received label signal.

Accordingly, the optical signal switching speed at the optical switching unit is limited by the modulation, demodulation, and frequency conversion of the label signal.

Patent Document 1: Japanese Laid-Open Patent Application No. 2001-36477.

Non-Patent Document 1: S. J. Ben Yoo, "All-optical label switching: Architecture, Protocol, and Systems Demonstration", Technical Digest of OptoElectronics and Communications Conference (OECC), paper no. 9A1-2, pp. 8–9, Yokohama, July, 2002.

Non-Patent Document 2: A. B. Sahin et al., "Dispersion Division Multiplexing for In-Band Subcarrier-Header-Based All-Optical Packet Switching", OSA Technical Digest of OFC (Optical Fiber Communication conference), no. WO1, pp. 279–280, March, 2002.

Non-Patent Document 3: Iga (writer and editor), "Semiconductor Laser", Chapter 7: Direct Modulation and Pulse Generation, Ohmsha (book publishing company), 1994.

Non-Patent Document 4: Ikushima et al., "Study on Analog Performance of optical Devices and System Design for 10,000 ch WDM/SCM Optical Transmission System using Direct Modulation", ITE (The Institute of Image Information and Television Engineers) Journal, vol.55, No.10, 2001, pp.1315–1321.

SUMMARY OF THE INVENTION

The object of the present invention is therefore to provide an optical switching system that has a simple circuit construction without circuits for modulation/demodulation and frequency conversions that are required in the known optical label switching, and switches the route of the optical signal at a high speed.

The above object is fulfilled by an optical switching system, comprising: a signal input unit operable to input an optical packet signal that includes an optical label signal converted by a direct modulation method from an electric label signal that has a frequency that corresponds to a destination of the optical packet signal; an optical-to-electrical conversion unit operable to convert the optical packet signal, which has passed through an optical filter that allows only signals with wavelengths within a predetermined range to pass through itself, into an electric signal; an extracting unit operable to extract the electric label signal from the electric signal; an electric power level detecting unit operable to detect an electric power level of the extracted electric label signal; a port determining unit operable to determine, based on the detected electric power level, a port to which the optical packet signal is to be output; and a signal output unit operable to output the optical packet signal to the determined port.

With the above-stated construction, the optical switching unit can identify the address information of an optical packet signal containing a label signal by detecting the electric power level of the label signal having been caused to pass through an optical filter and then been subjected to an optical-to-electrical conversion. Such a circuit requires only a simple construction and switches the route of the optical packet signal at a high speed without being limited by the processing speeds of circuits for modulation/demodulation and frequency conversions.

The optical packet signal dealt with in the optical switching system (i) includes an optical label signal converted by a direct modulation method from an electric label signal having one of frequencies that are assigned to a plurality of routes in advance, or (ii) has been converted by a direct modulation method from a multiplex signal in which the data signal is multiplexed with the label signal having one of frequencies that are assigned to a plurality of routes in advance.

Conventional label signals are modulated signals. Such conventional label signals have a problem that the changes in amplitude of the modulated signals affect the data signals. In contrast, the optical switching system of the present invention has an advantageous effect that the label signals used therein do not affect the data signals.

The above object is also fulfilled by an optical switching system, comprising: a signal input unit operable to input an optical packet signal that includes an optical label signal generated by phase-modulating an optical signal based on an electric label signal that has a frequency that corresponds to a destination of the optical packet signal; an optical-to-electrical conversion unit operable to convert the optical packet signal, which has passed through an optical filter that allows only signals with wavelengths within a predetermined range to pass through itself, into an electric signal; an extracting unit operable to extract the electric label signal from the electric signal; an electric power level detecting unit operable to detect an electric power level of the extracted electric label signal; a port determining unit operable to determine, based on the detected electric power level, a port to which the optical packet signal is to be output; and a signal output unit operable to output the optical packet signal to the determined port.

With the above-stated construction, the optical switching unit can identify the route of an optical packet signal containing an optical label signal generated by phase-modulating an optical signal based on an electric label signal that has a frequency that corresponds to a route of the optical packet signal. Such a circuit requires only a simple construction and switches the route of the optical packet signal at a high speed.

In the above-stated optical switching system, the electric label signal may have a sinusoidal waveform.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment 1

The following describes an optical switching system in Embodiment 1 of the present invention with reference to the attached FIGS. 1–6.

Outline

The present optical switching system is characterized in that the transmission apparatuses output optical signals including label signals that have different frequencies in correspondence with a plurality of destinations, and the switching apparatuses switch the destinations of the optical signals in accordance with the frequencies, where the label signals have a sinusoidal waveform.

The optical switching system includes an optical transmitting unit and an optical switching unit.

The optical transmitting unit assigns different frequencies to a plurality of signal destinations in advance (see FIG. 4A), and outputs an optical signal that contains an optical label signal converted from an electric label signal that has a frequency corresponding to the destination of the optical signal.

Figure 4A:
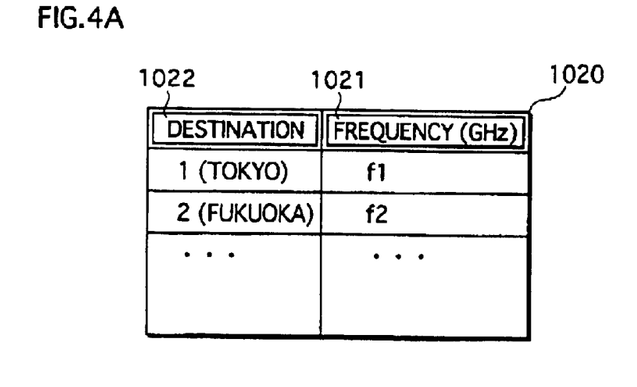
FIGS. 4A, 4B and 4C show the data referenced in the optical switching system.
Figure 4B:
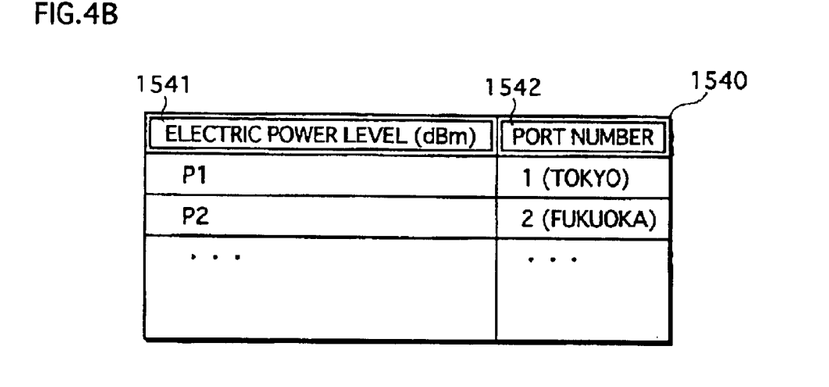

Since there is a one-to-one correspondence between the frequencies and the electric power levels of the label signals, the optical switching unit detects the electric power level of the label signal in the received optical signal, determines a port to which the optical signal is to be output, and outputs the optical signal to the determined port (see FIG. 4B).

Here, the above-mentioned correspondence between the frequencies and the electric power levels of the label signals is based on the dependence of the electric power levels. That is to say, the electric power level of the label signal that is extracted from an electric signal converted from the received optical signal varies depending on the frequency of the label signal.

This variation in the measured electric power level depending on the frequency is caused by the amount of optical chirping that is generated when the optical transmitting unit converts the electric signal into the optical signal, especially when the optical transmitting unit performs the electrical-to-optical conversion by the direct modulation method using a semiconductor laser diode. It should be noted here that the amount of optical chirping is a parameter that indicates the optical frequency fluctuation, and is also called Frequency Modulation (FM) efficiency.

In general, it is preferred that the optical chirping is suppressed since the optical chirping disturbs the optical waveform after a long-distance transmission due to the chromatic dispersion (a characteristic that the propagation speed varies depending on the wavelength) of the optical fiber.

However, inventors of the present invention, paying attention to the fact that the amount of optical chirping varies depending on the frequency, are using the amount of optical chirping to simplify the identification process of the signal destination and increase the processing speed of the optical switching unit.

The relationships between the electric power level and the frequency of the label signal will be described in detail with reference to FIGS. 5A and 5B.

In contrast to the conventional methods in which an optical label signal, which has been converted from a modulated electric label signal, is piggybacked onto an optical signal, the optical transmitting unit of the optical switching system in the present embodiment piggybacks an optical label signal, which is directly converted from a sinusoidal waveform signal having a frequency that corresponds to the destination, onto an optical signal as it is. Also, in contrast to the conventional methods in which a label signal is extracted from a received optical signal, demodulated and then read, the optical switching unit of the present optical switching system extracts a label signal from a received optical signal, detects the electric power level of the label signal, and identifies a port to which the optical signal is to be output.

This arrangement of the present invention increases the processing speed of the optical switching system since compared with the conventional methods, the optical transmitting unit of the present system does not require modulation when transmitting an optical signal, and the optical switching unit does not require demodulation when switching the route of the optical signal.

It is also possible to identify the port by detecting the frequency of the label signal. However, the electric power level of the label signal can be detected faster than the frequency of the label signal. As a result, detecting the electric power level is more effective than detecting the frequency.

It should be noted here that the address information (label) needs to contain at least such information to identify a port to which the packet is to be output.

Construction

Figure 1:
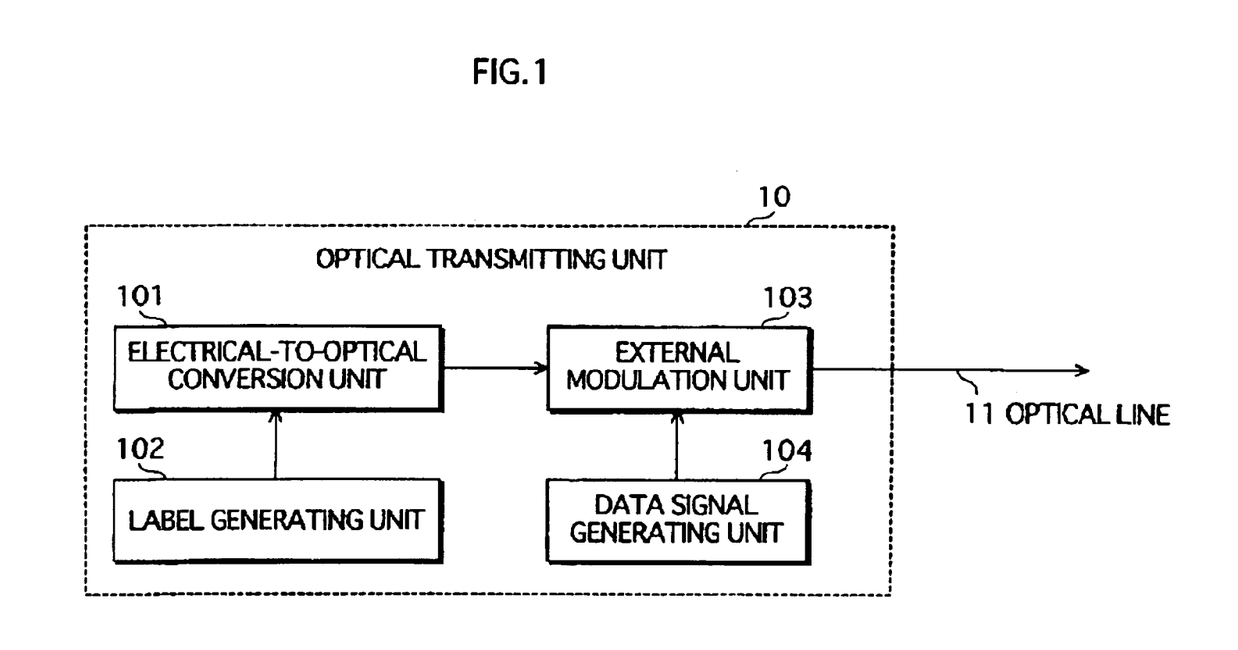
FIG. 1 is a block diagram showing the construction of the optical transmitting unit of the optical switching system in Embodiment 1.
Figure 2:
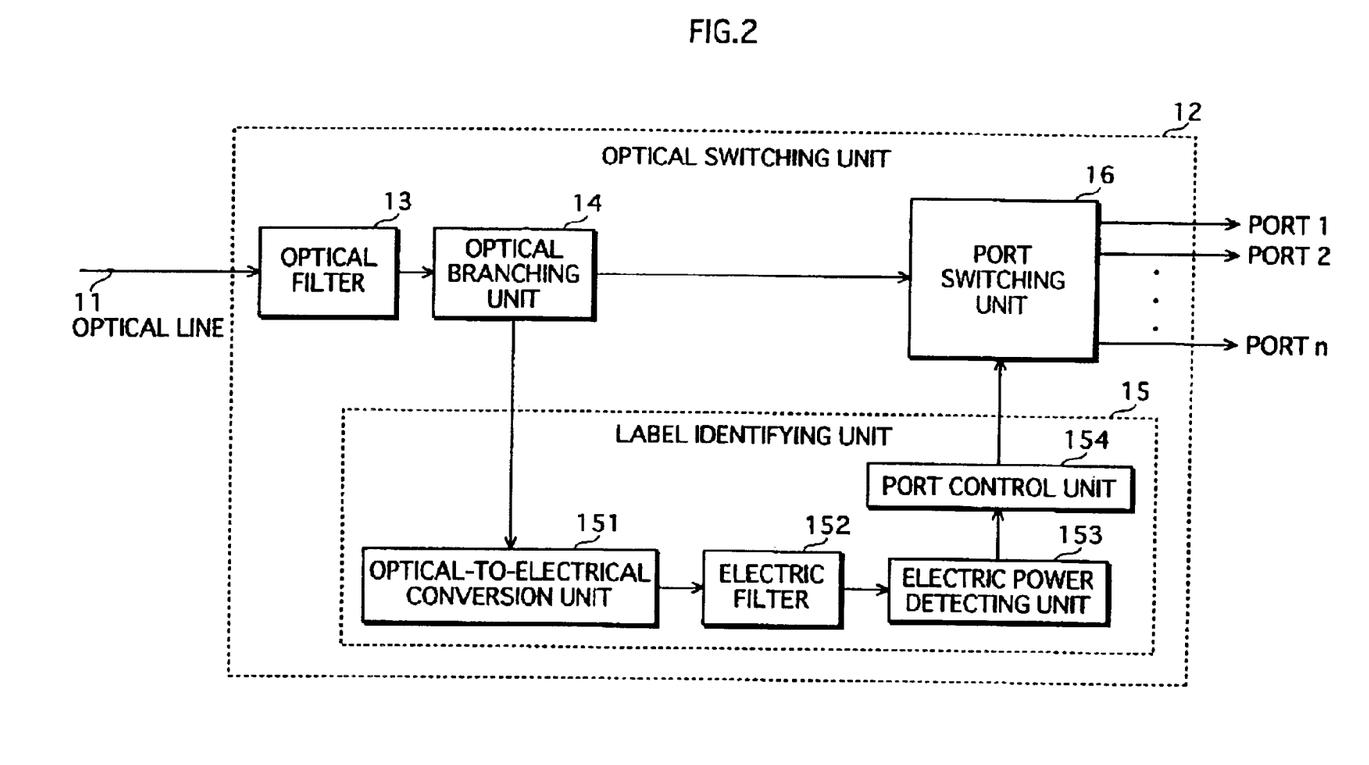
FIG. 2 is a block diagram showing the construction of the optical switching unit of the optical switching system in Embodiment 1.

The optical switching system in Embodiment 1 of the present invention includes an optical transmitting unit 10, an optical line 11, and an optical switching unit 12.

FIG. 1 is a block diagram showing the construction of the optical transmitting unit 10.

FIG. 2 is a block diagram showing the construction of the optical switching unit 12.

The optical transmitting unit 10 converts an electric signal composed of substantial data and labels into an optical signal, and outputs the optical signal. The optical signal passes through the optical line 11, which can be achieved by an optical cable including optical fiber paths, and reaches the optical switching unit 12. Upon receiving the optical signal from the optical transmitting unit 10, the optical switching unit 12 outputs the optical signal to a port that connects to a destination indicated by the label contained in the received optical signal.

Construction of Optical Transmitting Unit

As shown in FIG. 1, the optical transmitting unit 10 includes an electrical-to-optical conversion unit 101, a label generating unit 102, an external modulation unit 103, and a data signal generating unit 104.

The electrical-to-optical conversion unit 101 converts an electric signal into an optical signal. In this conversion, the electrical-to-optical conversion unit 101 also generates an optical label signal that has optical chirping. The generation of the optical label signal is achieved by adopting, as is the case with the present embodiment, the direct modulation method in which a semiconductor laser diode is used as a source of light, and a bias current is modulated by a label signal.

It should be noted here that the amount of optical chirping is called Frequency Modulation (FM) efficiency that indicates the optical frequency fluctuation.

The label generating unit 102 generates and outputs, as label signals, sinusoidal waveform signals having frequencies that correspond to destinations on a one-to-one basis, where each label (i.e. address information) indicates a destination of the packet, as well as an originator of the packet. It is presumed here that the label generating unit 102 is a voltage-control LED oscillator that outputs a sinusoidal waveform signal with a frequency that varies in accordance with the applied voltage.

The data signal generating unit 104 generates a data signal to be transmitted. The data signal is the same as those transmitted in conventional systems.

The external modulation unit 103 generates an optical signal composed of packets by performing the intensity modulation in external modulation on the optical label signal output from the electrical-to-optical conversion unit 101, in accordance with the data signal output from the data signal generating unit 104, and outputs the generated optical signal composed of packets (hereinafter referred to as an optical packet signal).

This means that the optical packet signal contains both the label signal and the data signal.

Now, the frequency allocation of the data signal and the label signal will be explained with reference to FIGS. 3A and 3B.

Frequency Allocation of Data Signal and Label Signal

In the present embodiment, a plurality of frequencies are assigned to the data signal and the label signal in advance. The allocation of the frequencies will be explained using an example case where there are two ports to which the optical signal can be output by the optical switching unit 12. In this example, frequencies f1 and f2 that respectively correspond to label information L1 and L2 are assigned to the label signal in advance.

Figure 3A:
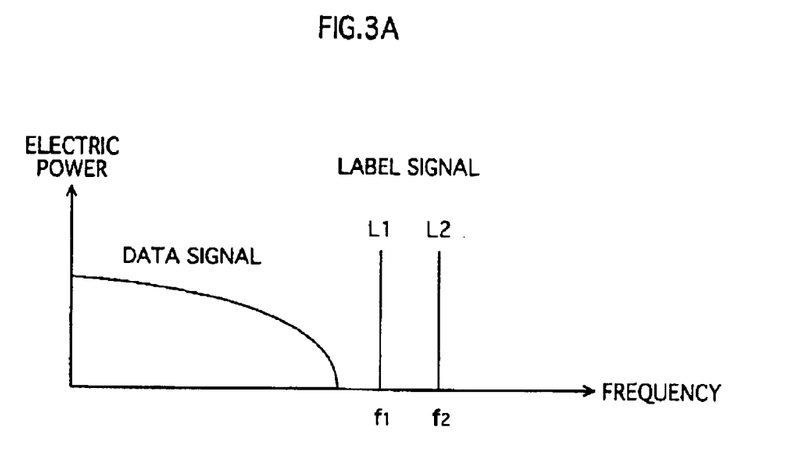
FIGS. 3A and 3B show the frequency allocation of the data signal and the label signal of the present invention.
Figure 3B:
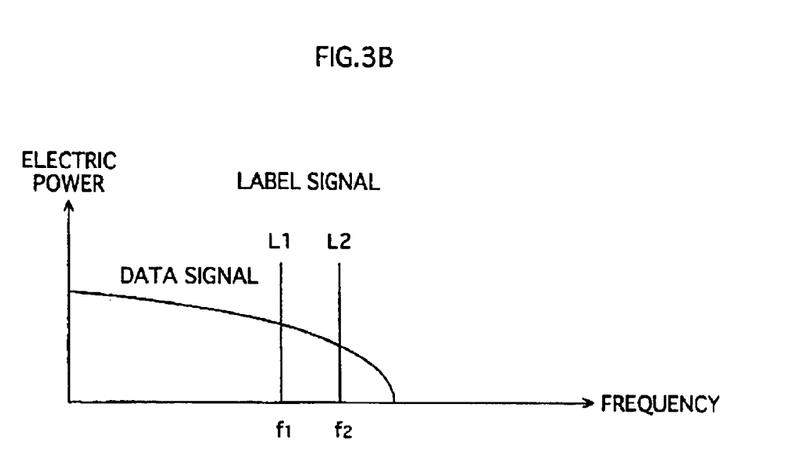

As shown in FIG. 3A, frequencies outside the frequency band of the data signal may be allocated as the frequencies f1 and f2 for the label signal, or as shown in FIG. 3B, frequencies inside the frequency band of the data signal may be allocated as the frequencies f1 and f2.

One of the two frequency allocation methods is adopted based on (i) the quality of the data and label signals, (ii) the characteristics of each device constituting the optical-to-electrical and/or electrical-to-optical conversion system or the like.

It is possible to select one of the two frequency allocation methods based on the high-frequency characteristic of the optical or electric device of the optical switching system. More specifically, the method shown in FIG. 3A in which frequencies for the label signal are outside the frequency band of the data signal is suitable for a case where the response characteristic of the semiconductor laser diode covers high frequencies. Also, the method shown in FIG. 3B in which frequencies for the label signal are inside the frequency band of the data signal is considered to be suitable for the "dispersion division multiplexing" or "RF fading" (see the Non-Patent Document 2 listed above).

The optical switching unit 12 extracts, as a label signal, a portion corresponding to a frequency band that includes a predetermined frequency (frequency f1 or f2 in the case of the present example as shown in FIGS. 3A and 3B), from the received optical signal.

In the case shown in FIG. 3A, it is easy to detect a label signal since the label signal has different frequencies from the data signal. In the case shown in FIG. 3B in which the frequencies of the label signal overlap with those of the data signal, the data signal is regarded as a signal that causes an interference with the label signal. However, it is possible to detect a label signal by checking whether a ratio of the label signal to the interference signal exceeds a predetermined value.

Since it is possible to allocate different frequencies to the label signal regardless of whether they are inside or outside the frequency band of the data signal, the number of usable labels or ports is not limited.

Construction of Optical Switching Unit

As shown in FIG. 2, the optical switching unit 12 includes an optical filter 13, an optical branching unit 14, a label identifying unit 15 and a port switching unit 16.

The optical filter 13 has a predetermined transmittance characteristic (dependence of transmittance on wavelength), and allows only part of the optical packet signal received via the optical line 11 that has a wavelength within a predetermined wavelength range to pass through itself. The optical filter 13 is achieved by, for example, an optical filter of Fourier diffraction grating type having a Gaussian-type transmittance as represented by the dotted line in FIG. 5B.

The optical branching unit 14 receives the optical packet signal from the optical filter 13, and causes the received optical packet signal to branch to the label identifying unit 15 and the port switching unit 16. The two branched optical packet signals have the same information.

The port switching unit 16 outputs the branched optical packet signal received from the optical branching unit 14 to one of output ports 1–n.

The label identifying unit 15 controls the route of the optical packet signal, that is to say, selects one among the n output ports based on the label signal and controls the port switching unit 16 to output the branched optical packet signal it receives to the selected port.

The label identifying unit 15 includes an optical-to-electrical conversion unit 151, an electric filter 152, an electric power detecting unit 153, and a port control unit 154.

The optical-to-electrical conversion unit 151 converts a branched optical packet signal received from the optical branching unit 14 into an electric signal by, for example, performing a direct detection.

The electric filter 152 is achieved by, for example, a High Pass Filter (HPF) or a Band Pass Filter (BPF), and extracts a label signal from the electric signal output from the optical-to-electrical conversion unit 151.

The electric power detecting unit 153 detects an electric power level of the label signal extracted by the electric filter 152.

The port control unit 154 identifies one of the n output ports that corresponds to the electric power level detected by the electric power detecting unit 153, and controls the port switching unit 16 to output the branched optical packet signal it receives to the identified port.

Data

Now, various types of data referenced by the apparatuses of the optical switching system in the present embodiment will be described with reference to FIGS. 4A–4C.

Data Referenced by Optical Transmitting unit

FIG. 4A shows the data structure of a destination table 1020 and an example of its contents.

The destination table 1020 includes a frequency column 1021 and a destination column 1022. The destination table 1020 is created and stored in a memory (not illustrated) in the optical transmitting unit 10 in advance, and is referenced by the label generating unit 102.

The label generating unit 102 detects a destination from the header of each packet, identifies a frequency that corresponds to the detected destination by referencing the destination table 1020, generates a sinusoidal waveform signal having the identified frequency, and outputs the generated sinusoidal waveform signal as a label signal.

In the present example, if the label generating unit 102 detects "1" from a header that indicates that the destination is Tokyo, it generates a sinusoidal waveform signal having frequency "f1" that corresponds to the detected destination "1" (Tokyo) according to the destination table 1020, and outputs the generated sinusoidal waveform signal as a label signal.

Data Referenced by Optical Switching Unit

FIG. 4B shows the data structure of a port number table 1540 and an example of its contents.

The port number table 1540 includes an electric power level column 1541 and a port number column 1542. The port number table 1540 is created and stored in a memory (not illustrated) in the optical switching unit 12 in advance, and is referenced by the port control unit 154.

In the present example, if the electric power detecting unit 153 detects an electric power level "P1", the port control unit 154 controls the port switching unit 16 so as to output the optical packet signal received from the optical branching unit 14, to the port "1" that corresponds to the electric power level "P1" according to the port number table 1540.

Figure 4C:
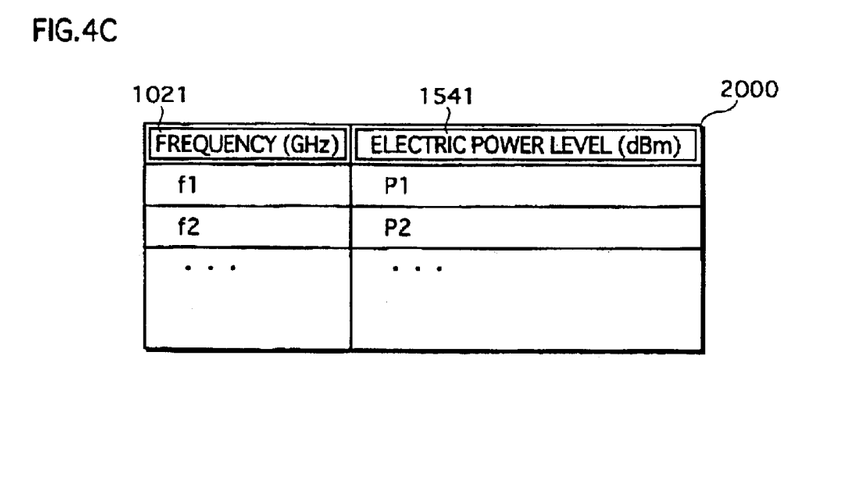

FIG. 4C shows the data structure of a correspondence table 2000 and an example of its contents.

It should be noted here that the correspondence table 2000 is not necessarily used in the present embodiment, but is shown for the sake of convenience.

The correspondence table 2000 includes the frequency column 1021 and the electric power level column 1541. The table 2000 shows, for example, that the frequency "f1", which corresponds to the destination "1" (Tokyo), corresponds to the electric power level "P1". Accordingly, the port control unit 154 controls the port switching unit 16 so as to output the packet having the frequency "f1" to the port "1" that corresponds to the electric power level "P1".

The following will describe (i) relationships between the frequency and the electric power level of the same label signal, and (ii) how the output port is switched in accordance with the electric power level.

Relationships Between Frequency and Electric Power Level of Label Signal

First, an electric power level detection method used in the present invention will be explained with reference to FIGS. 5A and 5B.

Figure 5A:
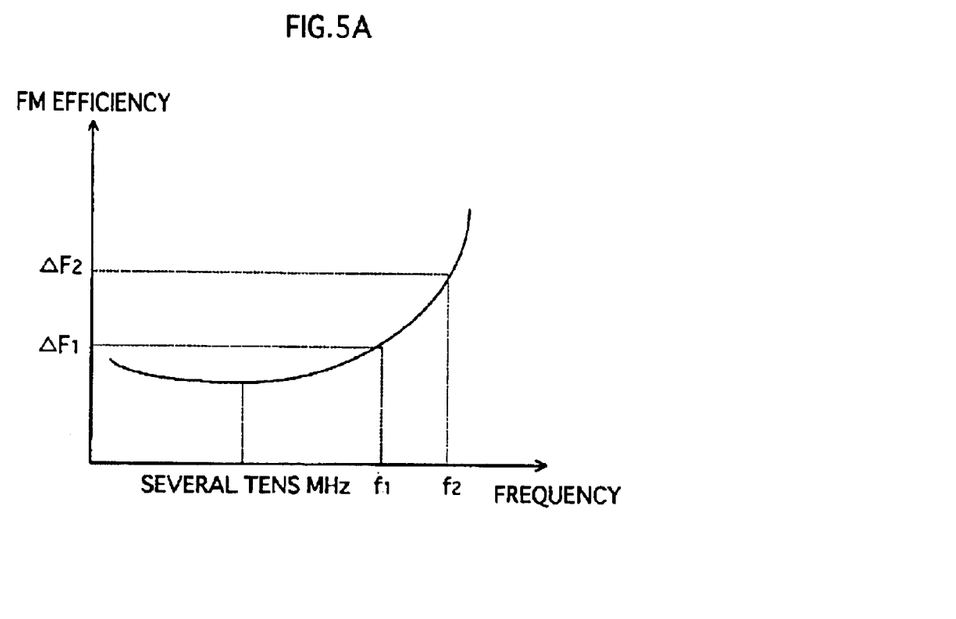
FIG. 5A shows a plot of the FM efficiency versus the frequency in the present invention.

FIG. 5A shows a plot of the FM efficiency versus the modulation frequency in the semiconductor laser diode used in the electrical-to-optical conversion unit 101, ΔF indicating the degree of optical chirping.

As shown in FIG. 5A, the FM efficiency increases as the modulation frequency increases if the modulation frequency is no less than several tens MHz (see the Non-Patent Document 3 listed above).

Figure 5B:
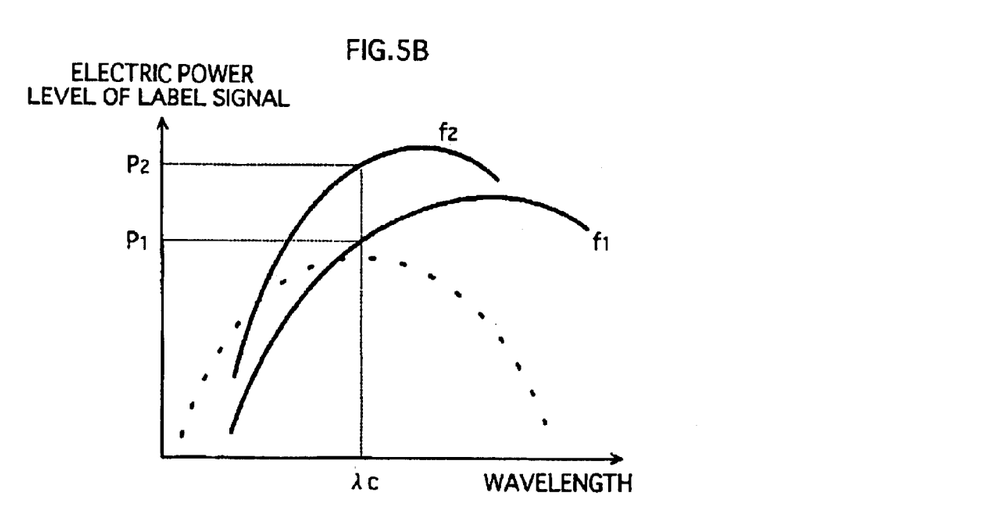
FIG. 5B shows a plot of the electric power of the label signal versus the frequency.

FIG. 5B shows a characteristic of the electric power level detected by the electric power detecting unit 153, namely the dependence of the electric power level on the frequency.

In FIG. 5B, $P_1$ and $P_2$ represent electric power levels corresponding to frequencies f1 and f2 at wavelength λc, respectively.

The dotted line in FIG. 5B shows the dependence of transmittance of the optical filter 13 on the wavelength. It is supposed here that the transmittance changes as the wavelength changes, and that the maximum transmittance is obtained at wavelength λc, which is the wavelength of the semiconductor laser diode used in the electrical-to-optical conversion unit 101.

The two solid lines in FIG. 5B show the dependence of the electric power levels of two label signals, which have been extracted by the electric filter 152 and respectively have wavelengths f1 and f2, on the wavelength.

It is understood from FIG. 5B that a deviation is observed between the electric power levels $P_1$ and $P_2$ at wavelength λc due to the difference, which is shown in FIG. 5A, between the two FM efficiency values corresponding to the two frequencies.

That is to say, the characteristics as shown in FIG. 5B are observed when optical packet signals, which have been generated by frequency-modulating label signals having different frequencies, are caused to pass through the optical filter and then be subjected to a direct detection (see the Non-Patent Document 4 listed above).

The dependence of the electric power level on the frequency as shown in FIG. 5B is a known characteristic that can be calculated or confirmed by measurement in advance from the dependence of transmittance on wavelength in the optical filter 13, the frequency of the label signal, and the amount of optical chirping of the optical signal.

The characteristic, namely, dependence of the electric power level on the wavelength in the electrical-to-optical conversion unit 101 is obtained by calculations using the following Equation 1.

$$C(\lambda) = \frac{1}{2} Z_0 \eta^2 (mP_{in})^2 \left[ \left\{ T + \frac{\partial T}{\partial \lambda} \left( -\frac{\lambda^2}{c} \Delta F \right) \Delta I_b \cos\phi \right\}^2 + \left\{ \frac{\partial T}{\partial \lambda} \left( -\frac{\lambda^2}{c} \Delta F \right) \Delta I_b \sin\phi \right\}^2 \right]$$

Equation 1

In the above Equation 1, $C(\lambda)$ represents the dependence of the electric power level on the wavelength in the electrical-to-optical conversion unit 101, C an electric power level, $\lambda$ a wavelength in the electrical-to-optical conversion unit 101, $\eta$ conversion efficiency of the optical-to-electrical conversion unit 151, $Z_0$ impedance after an optical-to-electrical conversion, $P_{in}$ optical power into the optical-to-electrical conversion unit 151, $T(\lambda)$ transmittance of the optical filter 13, $\Delta F$ FM efficiency of the electrical-to-optical conversion unit 101 (the amount of optical chirping), $\Delta I_b$ bias current from a threshold value in the electrical-to-optical conversion unit 101, m degree of optical modulation in the electrical-to-optical conversion unit 101, $\phi$ phase difference between intensity modulation component and optical frequency modulation component in the optical signal, and c the speed of light.

It is accordingly possible to create the correspondence table 2000 shown in FIG. 4C by obtaining electric power levels of the label signals from (i) the frequency of the label signal, (ii) transmittance of the optical filter, (iii) the amount of optical chirping that is obtained from the frequency of the semiconductor laser diode used to convert the label signal from electrical to optical.

It should be noted here that though in FIG. 5B, P2 is higher than P1, the levels of electric power vary depending on the semiconductor laser diode that is actually used.

Port Switching Procedures

Now, the procedures of label identification will be explained with reference to FIG. 5B.

As described above, when the electric power detecting unit 153 measures the electric power level of the label signal, the frequency can be identified, that is, the address information can be detected.

For example, when the optical switching unit 12 can output the optical signals to any of two ports ("1" and "2"), the port control unit 154 determines the port to be used for the output as follows.

If the electric power level of the label signal is P1, the corresponding frequency is f1, and the corresponding label is L1. Accordingly, the port control unit 154 controls the optical switching unit 12 to output the optical packet signal to the port "1".

Also, if the electric power level of the label signal is P2, the corresponding frequency is f2, and the corresponding label is L2. Accordingly, the port control unit 154 controls the optical switching unit 12 to output the optical packet signal to the port "2".

That is to say, the port control unit 154 selects a port to which the optical packet signal is to be output, among the ports 1 and 2, based on the electric power level detected by the electric power detecting unit 153.

Operation

The operation of the optical switching system of the present embodiment will be described.

Operation of Optical Transmitting Unit

First, the operation of the optical transmitting unit 10 will be described (see FIG. 1).

The data signal generating unit 104 generates a data signal of a packet to be transmitted, and outputs the data signal to the external modulation unit 103.

The label generating unit 102 references the destination table 1020 to detect a frequency corresponding to the destination contained in the label of the packet, and generates a sinusoidal waveform signal having the detected frequency, and outputs the generated sinusoidal waveform signal as a label signal to the electrical-to-optical conversion unit 101.

For example, if the label of the packet indicates that the destination is Fukuoka, the label generating unit 102 finds that the corresponding frequency is f2 by referencing the destination table 1020, and outputs a label signal having the frequency f2.

Upon receiving the label signal from the label generating unit 102, the electrical-to-optical conversion unit 101 converts the label signal into an optical label signal having an amount of optical chirping, and outputs the optical label signal to the external modulation unit 103.

Upon receiving the optical label signal from the electrical-to-optical conversion unit 101, the external modulation unit 103 performs the intensity modulation on the optical label signal by the data signal received from the data signal generating unit 104, and outputs the resultant signal as an optical packet signal. This means that the optical packet signal contains both the label signal and the data signal.

The optical packet signal passes through the optical line 11 and reaches the optical switching unit 12.

Operation of Optical Switching Unit

Second, the operation of the optical switching unit 12 will be described (see FIG. 2).

The optical switching unit 12 extracts a label signal from the optical packet signal received via the optical line 11, reads the label from the label signal, selects a port among n output ports (n is an integer no smaller than 2) in accordance with the label, and outputs the optical packet signal to the selected port.

The optical filter 13 of the optical switching unit 12 receives the optical packet signal via the optical line 11, and allows only part of the optical packet signal that has a wavelength within a predetermined wavelength range to pass through itself.

The optical branching unit 14 receives the optical packet signal from the optical filter 13, and causes the received optical packet signal to branch to the label identifying unit 15 and the port switching unit 16. The two branched optical packet signals have the same information.

The port switching unit 16 outputs the branched optical packet signal received from the optical branching unit 14 to the port selected by the label identifying unit 15 via an optical delay line (not illustrated).

Figure 6:
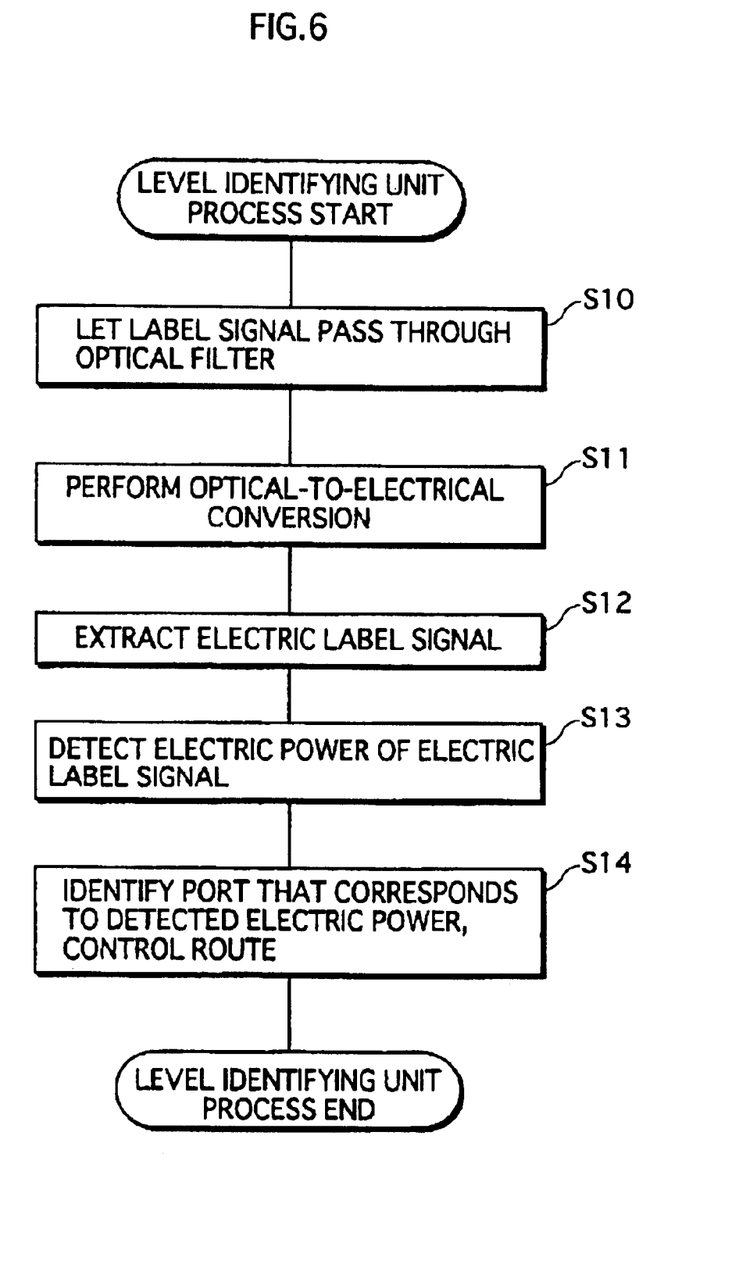
FIG. 6 is a flowchart showing the procedures of the label identifying unit.

Here, the process of the label identifying unit 15 will be described with reference to a flowchart shown in FIG. 6.

A label signal passes through the optical filter 13 (step S10). It should be noted here that it is a precondition for the process of the label identifying unit 15 that a target label signal has passed through the optical filter 13. In the present embodiment, label signals have passed through the optical filter 13 before the process of the label identifying unit 15, as shown in FIG. 2. Therefore, the step S10 is provided for the sake of confirmation of the precondition (see Supplementary Note 1 that will be provided later).

A branched optical packet signal is output from the optical branching unit 14 to the optical-to-electrical conversion unit 151 of the label identifying unit 15.

The optical-to-electrical conversion unit 151 converts the branched optical packet signal received from the optical branching unit 14 into an electric signal by performing a direct detection (step S11), and outputs the resultant electric signal to the electric filter 152.

The electric filter 152 extracts a label signal from the electric signal output from the optical-to-electrical conversion unit 151 (step S12), and outputs the extracted label signal to the electric power detecting unit 153.

In the case where the optical transmitting unit 10 employs the method shown in FIG. 3A in which frequencies for the label signal are outside the frequency band of the data signal, the electric filter 152 of the optical switching unit 12 that receives the optical packet signal from the optical transmitting unit 10 may extracts, as the label signal, a signal having a frequency within a frequency band that includes all the predetermined frequencies (in the case of the present embodiment, a frequency band including frequencies f1 and f2). This also applies to the method shown in FIG. 3B.

The electric power detecting unit 153 detects an electric power level of the label signal extracted by the electric filter 152 (step S13), and outputs the detected electric power level to the port control unit 154.

The port control unit 154 identifies one of the n output ports that corresponds to the electric power level detected by the electric power detecting unit 153, and controls the port switching unit 16 to output the branched optical packet signal it has received to the identified port (step S14).

For example, if the electric power level detected by the electric power detecting unit 153 is P2, the port control unit 154 controls the port switching unit 16 to output the optical packet signal to the port "2" (see FIGS. 4A–4C).

Embodiment 2

Figure 7:
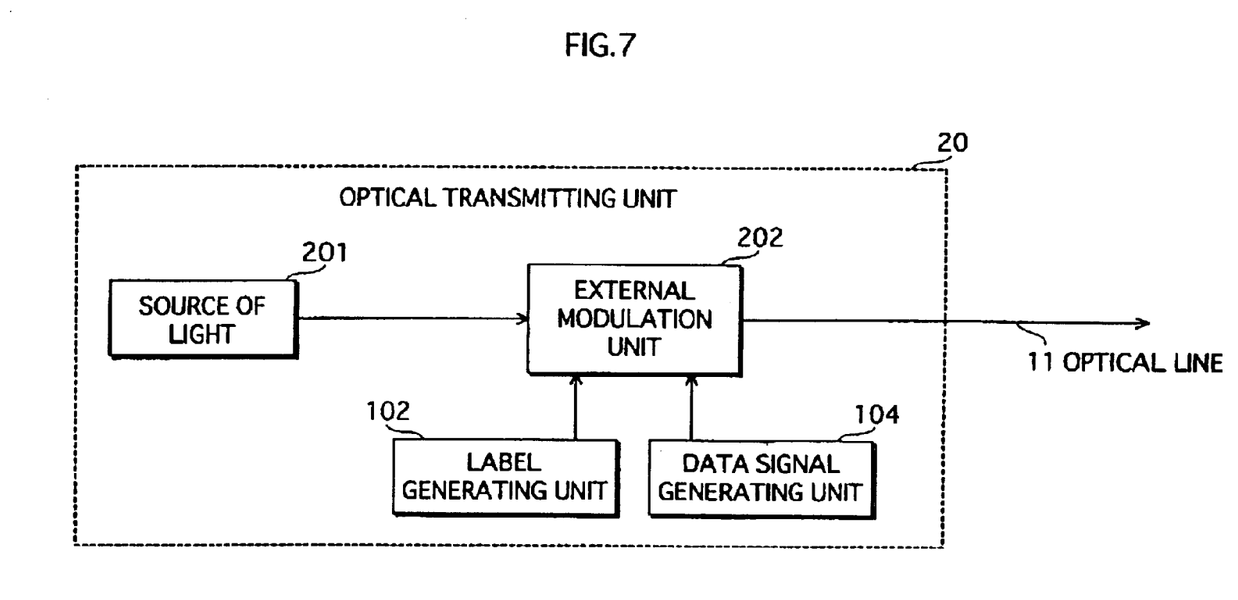
FIG. 7 is a block diagram showing the construction of the optical transmitting unit of the optical switching system in Embodiment 2.

The following describes an optical switching system in Embodiment 2 of the present invention with reference to the attached FIG. 7.

Outline

Embodiment 2 differs from Embodiment 1 in that the label signal output from the optical transmitting unit 10 is identified by an optical phase modulation component of the label signal, while in Embodiment 1, an optical intensity modulation component and an optical frequency modulation component of the label signal are used.

That is to say, in Embodiment 2, the optical transmitting unit 10 generates an optical packet signal by phase-modulating an optical signal based on a label signal, where different frequencies are assigned in advance to a plurality of signal destinations as in Embodiment 1, and the optical switching unit determines a port to which the received optical packet signal is to be output with the same procedures as in Embodiment 1.

The reason why the optical label signals are phase-modulated based on label signal in the present embodiment is based on the fact that if a continuous optical signal that has not been subjected to an intensity modulation is phase-modulated by an external modulation unit based on label signal, the wavelength of the optical signal also varies, as is the case with Embodiment 1, and that the characteristics shown in FIG. 5B are also obtained when optical label signals that have been generated by such phase-modulation are caused to pass through an optical filter and are subjected to a direct detection.

In Embodiment 2, the optical switching unit 12 used in Embodiment 1 is also used.

Construction

FIG. 7 is a block diagram showing the construction of an optical transmitting unit 20 of the optical switching system in Embodiment 2. The elements with reference numbers that have already been used in Embodiment 1 operate in the same manner, and the explanation thereof is omitted here.

The optical switching system in Embodiment 2 includes the optical transmitting unit 20, the optical line 11, and the optical switching unit 12 (see FIG. 2).

The optical transmitting unit 20 includes a source of light 201, the label generating unit 102, the data signal generating unit 104, and an external modulation unit 202.

The external modulation unit 202 is achieved by, for example, a lithium niobate (LN) modulator. The optical line 11 and the optical switching unit 12 have the same construction and operate in the same manner as in Embodiment 1.

Operation

The operation of the optical transmitting unit 20 will be described.

The source of light 201 is, for example, a semiconductor laser diode and outputs a continuous-wave optical signal.

The external modulation unit 202 phase-modulates the continuous optical signal output from the source of light 201 based on the label signal output from the label generating unit 102, and then performs an intensity modulation on the continuous optical signal based on the data signal output from the data signal generating unit 104, and outputs the resultant signal as an optical packet signal.

This means that the optical packet signal contains both the label signal and the data signal.

Embodiment 2 adopts the same frequency allocation of the data signal and the label signal as Embodiment 1.

In Embodiment 2, it is possible to switch the route of an optical packet signal with the same procedures as in Embodiment 1 since the characteristics shown in FIG. 5B are obtained when optical packet signals that have been generated by the phase-modulation as adopted in Embodiment 2 are caused to pass through an optical filter and are subjected to a direct detection.

Embodiment 3

Figure 8:
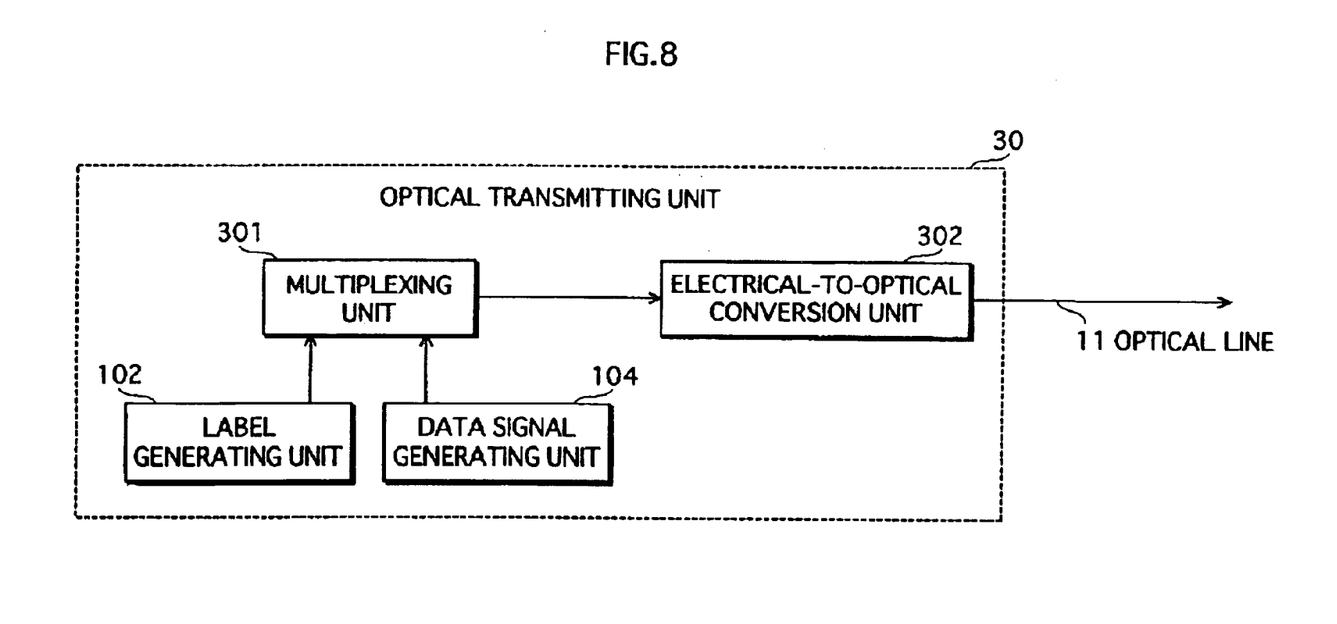
FIG. 8 is a block diagram showing the construction of the optical transmitting unit of the optical switching system in Embodiment 3.

The following describes an optical switching system in Embodiment 3 of the present invention with reference to the attached FIG. 8.

Outline

In Embodiment 3, first the label signal and the data signal are multiplexed, and then the multiplex signal is converted into an optical packet signal by direct modulation.

Embodiment 3 differs from Embodiment 1 in that the external modulation unit 103 is not used. This makes it possible to manufacture the optical transmission apparatus of Embodiment 3 at a lower cost than that of Embodiment 1.

The optical switching unit 12 of Embodiment 3 is the same as that of Embodiment 1.

Construction

FIG. 8 is a block diagram showing the construction of an optical transmitting unit 30 of the optical switching system in Embodiment 3.

The optical switching system in Embodiment 3 includes the optical transmitting unit 30, the optical line 11, and the optical switching unit 12 (see FIG. 2).

The optical transmitting unit 30 includes the label generating unit 102, the data signal generating unit 104, a multiplexing unit 301, and an electrical-to-optical conversion unit 302. The construction and operation of the optical line 11 and the optical switching unit 12 in Embodiment 3 are the same as in Embodiment 1.

Operation

The operation of the optical transmitting unit 30 will be described.

The multiplexing unit 301 multiplexes the label signal output from the label generating unit 102 and the data signal output from the data signal generating unit 104 into a multiplexed signal, and outputs the multiplexed signal.

The electrical-to-optical conversion unit 302 converts an electric signal into an optical signal. For this conversion, the electrical-to-optical conversion unit 302 employs direct modulation, and uses a semiconductor laser diode as a source of light, modulates a bias current by a multiplexed signal so as to generate an optical packet signal having optical chirping.

In Embodiment 3, it is possible to switch the route of an optical packet signal with the same procedures as in Embodiment 1 since the characteristics shown in FIG. 5B are obtained when the optical packet signals, which have been generated by frequency-modulating the optical signals by label signals having different frequencies, are caused to pass through an optical filter and are subjected to a direct detection.

Supplementary Notes

Up to now, a few embodiments of the optical switching system of the present invention have been described with reference to the attached drawings. However, not limited to the above-described embodiments, the optical switching system of the present invention can be modified as follows, for example.

(1) In the above-described embodiments, the optical filter 13 is placed before the optical branching unit 14 in the optical switching unit 12. However, the optical filter 13 may be placed after the external modulation unit 103 or in the optical transmitting unit 10, 20 or 30, or may be placed between the optical branching unit 14 and the optical-to-electrical conversion unit 151. Also, the optical filter 13 may be included in the optical line 11.

This is because the label identifying unit can determine, from an optical packet signal, the port to which the optical packet signal is to be output in so far as the optical packet signal passes through an optical filter before it is subjected to an optical-to-electrical conversion.

(2) In the above-described embodiments, the optical filter 13 is used. However, a wavelength demultiplexing filter may be used instead in a wavelength division multiplexing (WDM) network.

(3) In the above-described embodiments, the optical switching unit outputs a label signal to a port as it is. However, the optical switching unit may add another information to the received label signal based on another address information, and output the updated label signal.

To achieve the above-described function, a label adding unit, for example, is deposited between the electric power detecting unit 153 and the port control unit 154. The label adding unit generates a label signal having a certain frequency based on another address information. The port switching unit 16 performs an external modulation on a branched optical packet signal it receives from the optical branching unit 14, based on the frequency of the new label signal.

With such an external modulation, the label initially given from the optical transmitting unit is converted into another label, namely another address information.

The port switching unit outputs the optical packet signal containing the new label to another optical switching unit.

(4) In the above-described embodiments, the intensity modulation and the direct detection are used for the optical-to-electrical conversion and the electrical-to-optical conversion. However, for example, the optical coherent transmission method may also be used.

(5) In the above-described embodiments, the label generating unit 102 generates sinusoidal waveform signals as the label signals. However, not limited to this, the label generating unit 102 may generate label signals other than the sinusoidal waveform signals.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical switching system, comprising:
   a signal input unit operable to input an optical packet a signal that includes an optical label signal converted by a direct modulation method from an electric label signal that has a frequency that corresponds to a destination of the optical packet signal;
   an optical-to-electrical conversion unit operable to convert the optical packet signal, which has passed through an optical filter that allows only signals with wavelengths within a predetermined range to pass through itself, into an electric signal;
   an extracting unit operable to extract the electric label signal from the electric signal;
   an electric power level detecting unit operable to detect an electric power level of the extracted electric label signal;
   a port determining unit operable to determine, based on the detected electric power level, a port to which the optical packet signal is to be output; and
   a signal output unit operable to output the optical packet signal to the determined port.

2. An optical switching system, comprising:
   a signal input unit operable to input an optical packet signal that includes an optical label signal generated by phase-modulating an optical signal based on an electric label signal that has a frequency that corresponds to a destination of the optical packet signal;
   an optical-to-electrical conversion unit operable to convert the optical packet signal, which has passed through an optical filter that allows only signals with wavelengths within a predetermined range to pass through itself, into an electric signal;
   an extracting unit operable to extract the electric label signal from the electric signal;
   an electric power level detecting unit operable to detect an electric power level of the extracted electric label signal;
   a port determining unit operable to determine, based on the detected electric power level, a port to which the optical packet signal is to be output; and
   a signal output unit operable to output the optical packet signal to the determined port.

3. The optical switching system of claim 1, wherein the electric label signal has a sinusoidal waveform.

* * * * *